Oct. 29, 1957 L. G. PLANT 2,811,008
TINE MOUNTING FOR RAKING WHEEL
Filed Sept. 25, 1953 2 Sheets-Sheet 1

INVENTOR.
BY LELAND G. PLANT

Oct. 29, 1957 L. G. PLANT 2,811,008
TINE MOUNTING FOR RAKING WHEEL
Filed Sept. 25, 1953 2 Sheets-Sheet 2
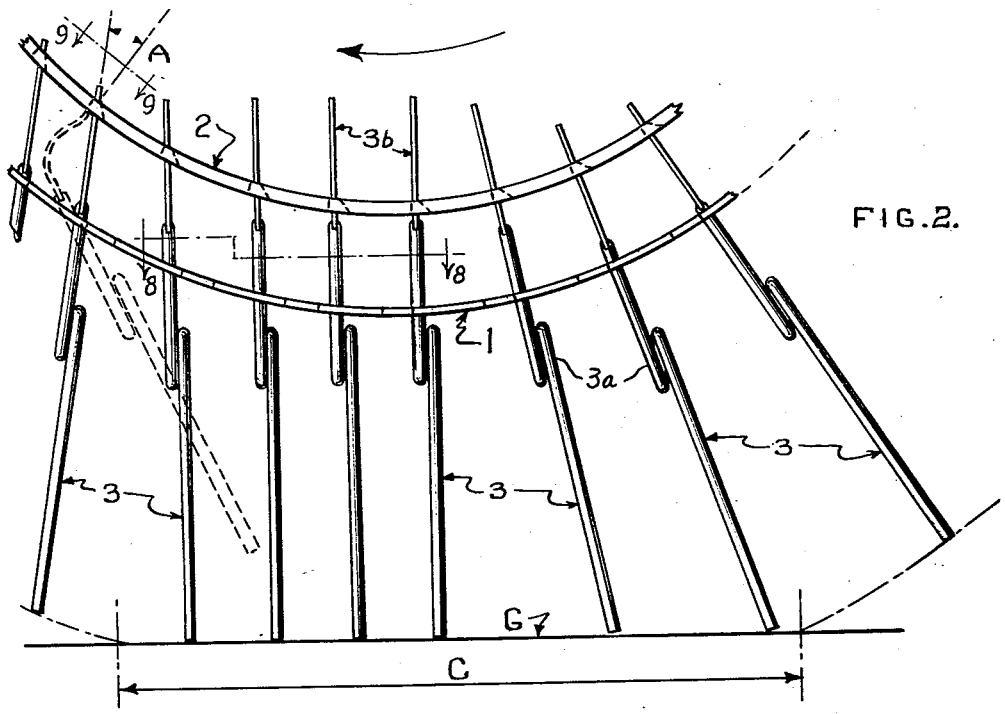
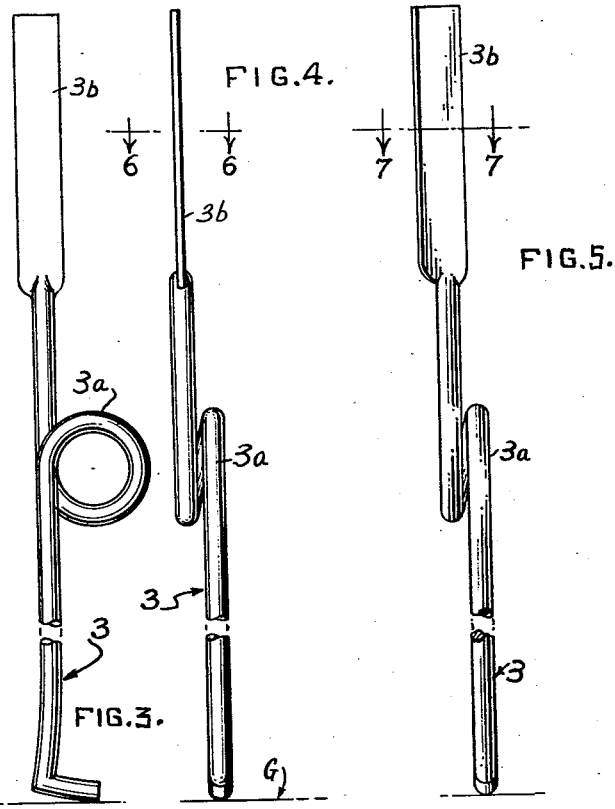
INVENTOR.
LELAND G. PLANT.

2,811,008
Patented Oct. 29, 1957

2,811,008
TINE MOUNTING FOR RAKING WHEEL

Leland G. Plant, Edenton, N. C.; Pattie Louise Moore Plant, executrix of the last will and testament of Leland G. Plant, deceased Application September 25, 1953, Serial No. 382,391

4 Claims. (Cl. 56—367)

This invention relates to hay rakes of the type having tines that are rotated, each tine being mounted on the periphery of one of several wheels that are free to revolve in planes oblique to the direction in which they are traveling, said wheels being disposed in echelon so that the windrow left by the foremost wheel lies in the path of the wheel immediately trailing it and in turn this wheel deposits its windrow in the path of the wheel following it and so on to the rear wheel in this echelon arrangement by which the accumulated hay is deposited in a windrow at one side of the swath spanned obliquely by the several wheels in the raking machine assembly. The invention is limited in practice to rakes of the above described type wherein no substantial portion of the wheel weight is normally supported by its tines.

In all earlier rakes of this type the wheels have had to be spaced at a distance between their centers only slightly exceeding their radius dimension from hub center to tip of tine and in this arrangement the angle of planes in which these wheels rotate to the direction in which they are being drawn is customarily limited to approximately 45 degrees. If the wheels are disposed at a more oblique angle to direction of travel or spaced further apart the gap between paths in which adjacent wheels contact the ground as they travel with the machine is such that some hay is left unraked between the wheels. My invention lies in the design of a wheel and tines mounted thereon such that width of the several paths in which the tines of each wheel contact the ground is widened so that the spacing between wheel centers can be increased to an extent, for instance, that enables four wheels assembled with tines as herein described to rake a wider swath with lesser intermediate unraked gaps than can be raked by machines of prior design having five wheels of the same outer diameter.

In my invention the tines are free to swing downwardly into more closely grouped clusters when in contact with the ground surface than in other positions around the wheel perimeter as it is rotated. These tines are also free to slide outwardly and inwardly in respect to the wheel center as it revolves so that as the wheel rolls over a surface upon which it is supported at a substantially constant hub height the tips of a group of tines pointing downward lie in contact with this ground surface over a wide path. In further distinction to the conventional finger type rakes in which the tines are mounted in a fixed position upon the periphery at an angle of approximately 30 degrees to radii of a raking wheel in order to shed hay as the tines are rotated upwardly, the pivotable and/or slideable principle employed in mounting tines as herein described enables these tines to assume a vertical position when directly under the hub and when moving rearwardly therefrom but to droop at the desired angle when they swing upwardly as the wheel revolves. As the tines in my arrangement are not required to support any wheel weight they can be made of lighter wire with less danger of breaking than in tines for wheel rakes of the conventional type preceding my invention.

In the drawings accompanying this specification:

Figure 1 is an elevational view of a wheel in which raking tines are slidably and pivotally mounted according to the invention whereby, in any position of the wheel, three or more of the tines are simultaneously free, without bending, to rest their tips upon a flat ground surface below the wheel, and whereby these tines can droop downwardly relative to radial lines through the wheel axis as they travel upwardly on the wheel rim.

Figure 2 is a fragmentary elevational view, on an enlarged scale, of the lower portion of the tine-equipped wheel, the tines being grouped closely as in actual practice, but the wheel spokes being omitted for sake of clarity.

Figure 3 is an enlarged elevational view of one of the tines per se, showing a forged construction wherein the ground contacting tip or foot of the tine may be upset or angulated to enlarge the bearing surface thereof on the ground, and also showing a coiled loop near the upper end of the tine for increased resiliency, and the upper end portion or shank of the tine expanded to a rectangular cross-section.

Figure 4 is an elevational view of the tine shown in Figure 3 but taken at right angles thereto.

Figure 5 is an elevational view, similar to that shown in Figure 4 but showing a modified form of the tine wherein the rectangular shank lies in a plane offset angularly from the plane of the coiled loop rather than being parallel thereto.

Figure 6 is a cross-sectional detail on an enlarged scale, taken substantially in the plane of the line 6—6 in Figure 4.

Figure 7 is a cross-sectional detail on an enlarged scale, taken substantially in the plane of the line 7—7 in Figure 5.

Like characters of reference are used to designate like parts in the specification and throughout the several views of the drawings.

Figure 1:
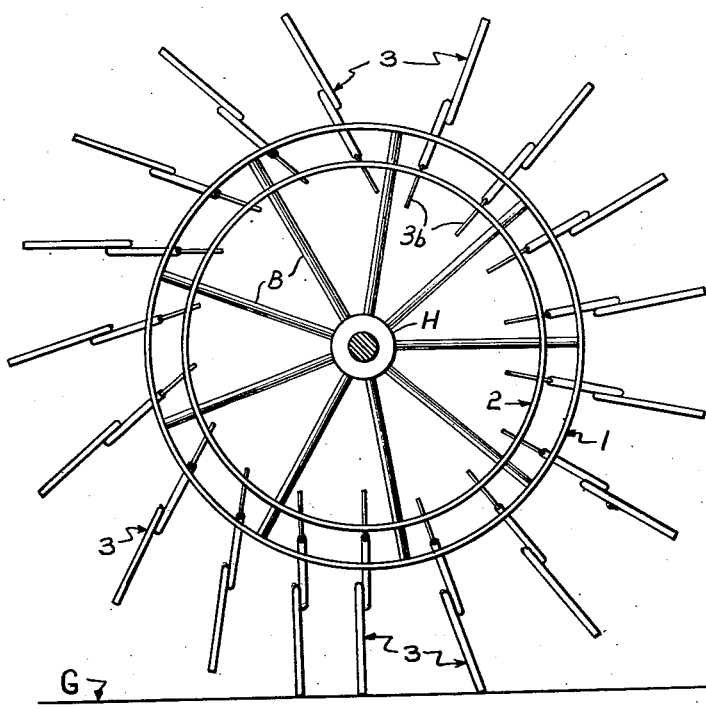
Figure 8:
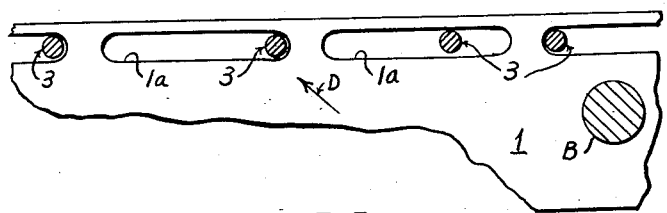
Figure 8 is a fragmentary detail of the wheel rim, taken substantially in the plane of the line 8—8 in Figure 2.
Figure 9:
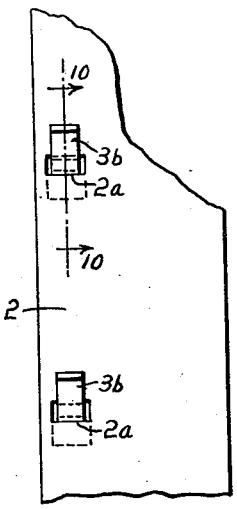
Figure 9 is a fragmentary detail of the inner peripheral band of the wheel, taken substantially in the plane of the line 9—9 in Figure 2.

The outer peripheral band or rim of the raking wheel is indicated by the reference numeral 1, the same being provided with slots 1a through which the raking tines 3 are extended and are guided thereby in their sliding and pivotal movement relative to the wheel. The inner peripheral band of the wheel is shown at 2 and is formed with perforations 2a to receive the rectangular, flat shanks 3b of the tines 3.

The tines 3, formed from round bars or rods, are provided intermediate their ends with coiled loops 3a to increase their resiliency, and the ground engaging ends of the tines may be offset or angulated as shown at 3c to increase their bearing surface upon the ground.

Figure 10:
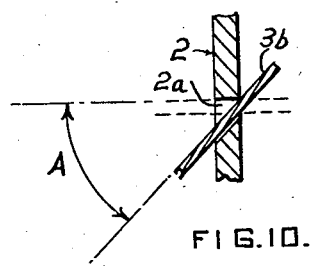
Figure 10 is a fragmentary sectional detail showing the arrangement of one of the tines with respect to the inner peripheral band of the wheel, this being taken substantially in the plane of the line 10—10 in Figure 9.

The reference character A in Figure 10 designates the angle taken by the tine relative to the inner band 2 while the tine rises from the ground, the position of the tine in radial alignment with the wheel being shown by dotted lines. The character C designates the span over which the tips of a group of tines simultaneously engage the ground surface during rotation of the wheel. D shows the oblique direction in which the raking wheel is drawn over the ground surface G. H designates the hub of the wheel, while B designates the wheel spokes.

The invention is applicable to raking wheels of spoked construction or with solid disc centers. In either event, the outer and inner peripheral bands 1 and 2 are provided concentrically on the wheel. These bands are preferably of flat bar section, rolled in different radii about the same hub center, but they may be of an irregular cross-section for purposes of reinforcement. In the spoked construction the spokes B projecting from the hub H are welded or riveted at their outer ends to the outer band 1 and project through the apertures in the inner band 2 to which they are also secured, such as by welding. Where the wheel center is a disc fabricated about its hub, the outer and inner bands may be formed integrally with the disc, the inner band being welded along one of its edges to the disc so as to lie in the same plane as the outer band.

The aforementioned slots 1a are regularly spaced and parallel to the edge of the band 1. The perforations 2a of the inner band 2 are rectangular, each being disposed on a radial line from the hub H through one end of the slot 1a. The slots 1a extend in the same direction and for the same distance from the ends thereof which are in radial alignment with the respective perforations 2a. The slots 1a are slightly wider than the thickness of the tines 3, so that the tines can freely slide and swing therein. The rectangular perforations 2a are dimensioned to accommodate the shanks 3b of the tines in a slidable and swingable manner, although axial rotation of the tines is prevented by the rectangular configuration of the shanks 3b and perforations 2a. The shanks 3b are wider than the width of the slots 1a, so that they cannot pass therethrough unless they are turned into longitudinal alignment therewith.

To insert a tine in the wheel, the tine shank 3b is first passed from the outside through one of the slots 1a in the outer band 1 until the round stem of the tine is in the slot. The tine is then turned so that its rectangular shank 3b is transverse to the slot and, thus, cannot be withdrawn therefrom.

The shank 3b is then bent or sprung as shown by the dotted lines in Figure 2, so that its tip can be inserted in the perforation 2a aligned with the slot 1a through which the tine has been passed. As the shank 3b straightens, it is projected through the perforation 2a, and in this position it cannot be removed from the wheel without again bending the shank. However, as thus attached, the tine is free to slide radially until its round section contacts the inner band 2, the perforation 2a being of such size that the round section of the tine cannot pass therethrough. Moreover, the tine can pivot or swing about the point where the shank 3b enters the perforation 2a, the extent of this swinging movement being limited by the length of the slot 1a. Thus, when the wheel rotates, the tines assume radial alignment during downward movement with the wheel and tend to fall toward the ground until they are in vertical contact therewith when the wheel passes over this point. As the wheel continues to turn, the tines ascend, the slots 1a permit the tines to swing while pivoting in the perforations 2a, so that they droop and shed any hay, or the like, such as may become entrained thereon as they rise from the ground.

It will be observed from the foregoing that the invention enables groups of tines to continuously contact the ground surface G over a wide span C as the raking wheel turns, without depending on flexing of the tines and thus obviating the necessity of using multiple spring coils required in finger-type tines of conventional construction. The tines in accordance with this invention are relatively simple, less expensive to fabricate and require no bolts or fixtures for their attachment to the wheel, as in tines of the conventional variety. Wear and breakage of the tines is minimized by the invention in its application to raking wheel which do not rest any substantial part of their weight on the tines, as provided for in rakes of the type devised by the inventor.

I claim:

1. The combination of a raking wheel having an outer rim provided with guide slots parallel to its edge, and an inner band concentric with said outer rim provided with perforations aligned radially with said slots, and tines mounted on said wheel, said tines passing slidably through said slots and perforations and being swingable therein through predetermined arcs in the plane of the wheel.

2. The combination of a raking wheel having an outer rim provided with guide slots parallel to its edge, and an inner band concentric with said outer rim provided with rectangular perforations aligned radially with said slots, tines carried by said wheel having stems slidable in said slots and protruding therefrom to engage the ground, and rectangular shanks provided on said tines and passing through said perforations, said tines being non-rotatable but swingable in said slots in the plane of said wheel.

3. The device as defined in claim 2 wherein the stems of said tines are larger than said perforations and wherein said shanks of the tines are wider than said slots and passable therethrough only when disposed in a plane parallel to the longitudinal axis of the slots.

4. The device as defined in claim 2 together with coiled loops provided on the stems of said tines exteriorly of said rim.

References Cited in the file of this patent

UNITED STATES PATENTS

| | | |
|---|---|---|
| 468,382 | Beck | Feb. 9, 1892 |
| 1,103,419 | Kaasa | July 14, 1914 |
| 1,393,210 | Florence | Oct. 11, 1921 |
| 1,802,711 | Fitts | Apr. 28, 1931 |
| 2,532,652 | Wray | Dec. 5, 1950 |
| 2,644,292 | Oberholtz et al. | July 7, 1953 |
| 2,652,679 | Krause | Sept. 22, 1953 |
| 2,670,588 | Plant | Mar. 2, 1954 |

FOREIGN PATENTS

| | | |
|---|---|---|
| 674,797 | Great Britain | July 2, 1952 |